United States Patent
Kneckt et al.

(10) Patent No.: US 9,832,758 B2
(45) Date of Patent: *Nov. 28, 2017

(54) RESERVING TRANSMISSION RESOURCES IN WIRELESS NETWORK

(75) Inventors: Jarkko Kneckt, Espoo (FI); Eng Hwee Ong, Singapore (SG)

(73) Assignee: Nokia Technologies Oy, Espoo (FI)

( * ) Notice: Subject to any disclaimer, the term of this patent is extended or adjusted under 35 U.S.C. 154(b) by 65 days.

This patent is subject to a terminal disclaimer.

(21) Appl. No.: 13/980,218

(22) PCT Filed: Feb. 15, 2011

(86) PCT No.: PCT/FI2011/050141
§ 371 (c)(1),
(2), (4) Date: Jul. 17, 2013

(87) PCT Pub. No.: WO2012/110680
PCT Pub. Date: Aug. 23, 2012

(65) Prior Publication Data
US 2013/0294394 A1    Nov. 7, 2013

(51) Int. Cl.
*H04W 72/04*  (2009.01)
*H04W 74/08*  (2009.01)
*H04W 84/12*  (2009.01)
*H04W 74/00*  (2009.01)

(52) U.S. Cl.
CPC ....... *H04W 72/04* (2013.01); *H04W 74/0816* (2013.01); *H04W 74/004* (2013.01); *H04W 74/006* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,031,336 B2* | 4/2006 | Scherzer | H04W 28/18 370/338 |
| 8,886,755 B1* | 11/2014 | Liu et al. | 709/218 |
| 2004/0242252 A1* | 12/2004 | Hoeben | 455/503 |
| 2005/0153735 A1* | 7/2005 | Morioka | H04L 47/10 455/553.1 |

(Continued)

FOREIGN PATENT DOCUMENTS

| | | | | |
|---|---|---|---|---|
| FR | WO2010072624 | * | 1/2010 | ............ H04W 74/08 |
| JP | WO 2009/084609 A2 | * | 7/2009 | |

(Continued)

OTHER PUBLICATIONS

International Search Report and Written Opinion received for corresponding Patent Cooperation Treaty Application No. PCT/FI2011/050141, dated May 11, 2011, 4 pages.

(Continued)

*Primary Examiner* — Jeffrey M Rutkowski
*Assistant Examiner* — Ning Li
(74) *Attorney, Agent, or Firm* — Banner & Witcoff, Ltd.

(57) ABSTRACT

Methods, apparatuses, and a computer program are presented for determining a reservation period for data transmission in a wireless communication network. The duration of the reservation period is determined on the basis of RTS/CTS handshake between a transmitter and a receiver apparatus.

18 Claims, 4 Drawing Sheets

(56) References Cited

U.S. PATENT DOCUMENTS

| | | | |
|---|---|---|---|
| 2005/0201361 A1* | 9/2005 | Morioka | H04W 74/085 370/352 |
| 2006/0109813 A1* | 5/2006 | Saito | H04W 28/16 370/329 |
| 2006/0165191 A1* | 7/2006 | Lin | H04B 7/0417 375/267 |
| 2008/0089221 A1* | 4/2008 | Bruninghaus et al. | 370/203 |
| 2008/0298306 A1* | 12/2008 | Larsson | H04L 1/0002 370/328 |
| 2010/0081394 A1* | 4/2010 | Mashimo | H04W 16/14 455/70 |
| 2010/0091716 A1* | 4/2010 | Bonta et al. | 370/329 |
| 2011/0038262 A1* | 2/2011 | Nabetani et al. | 370/232 |
| 2011/0194644 A1* | 8/2011 | Liu et al. | 375/295 |
| 2011/0249659 A1* | 10/2011 | Fontaine et al. | 370/338 |
| 2012/0044900 A1* | 2/2012 | Morioka | H04B 7/0617 370/329 |

FOREIGN PATENT DOCUMENTS

| | | |
|---|---|---|
| WO | 2004088886 | 10/2004 |
| WO | 2006083021 | 8/2006 |
| WO | 2007113730 | 10/2007 |

OTHER PUBLICATIONS

Tanigawa Y et al. "Multi-Channel MAC Protocols with Two Transceivers Pursuing Effective Use of Vacant Rresources", Counsumer Communications and Networking Conference (CCNC), 2010 7th IEEE, ieee, Piscataway, NJ, USA, Jan. 9, 2010.

* cited by examiner

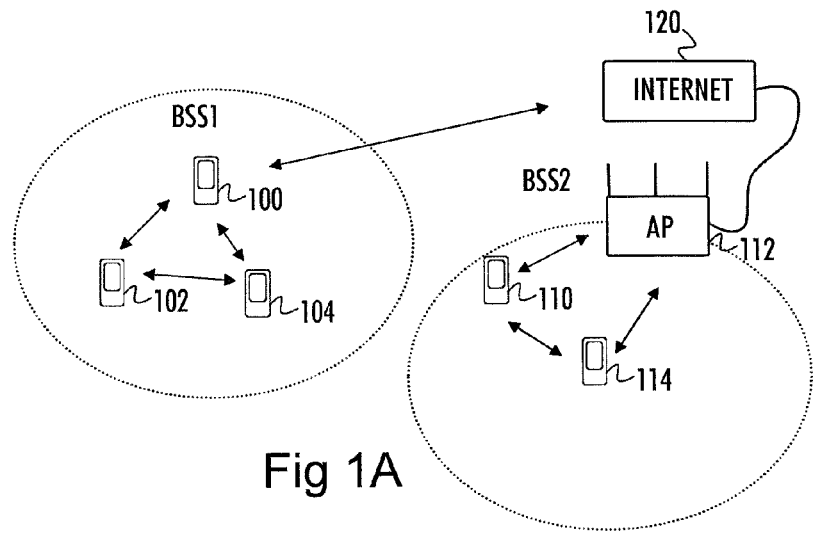
Fig 1A
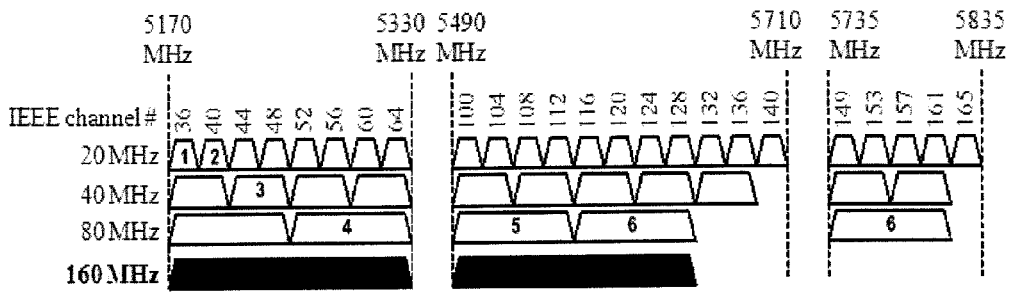
Fig 1B
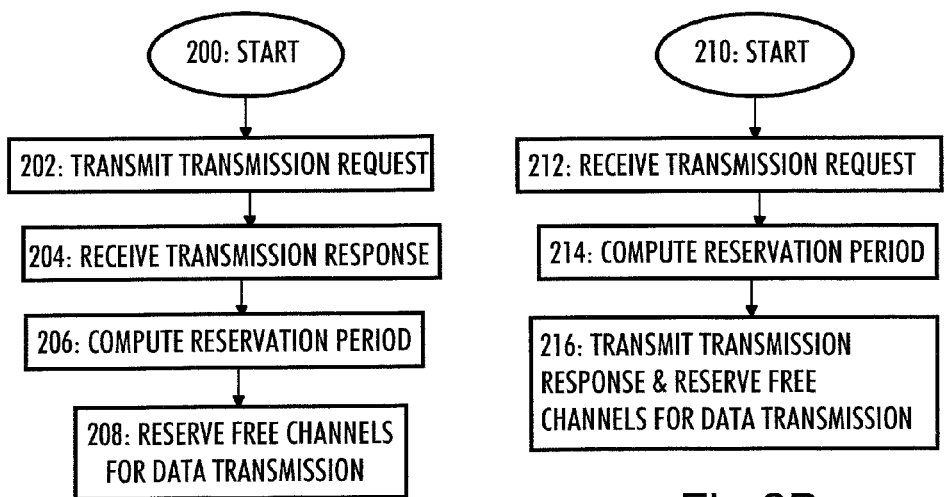
Fig 2A
Fig 2B

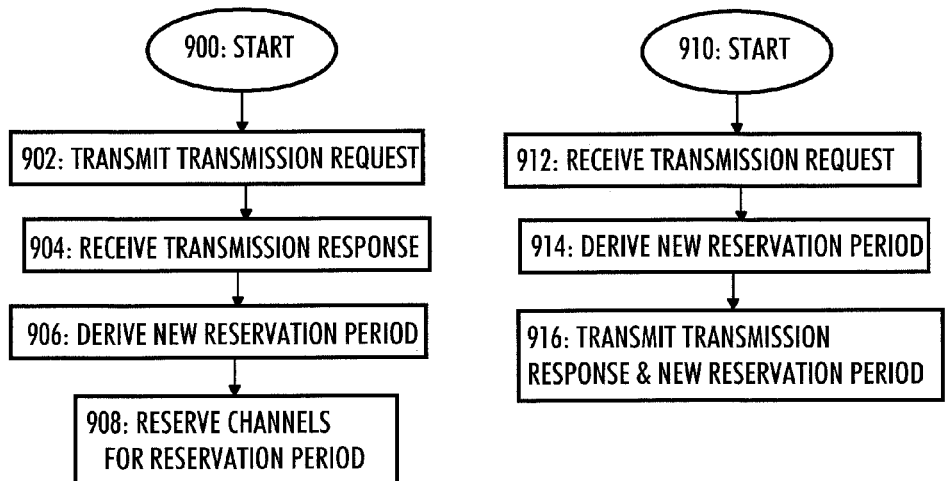
Fig 9A
Fig 9B
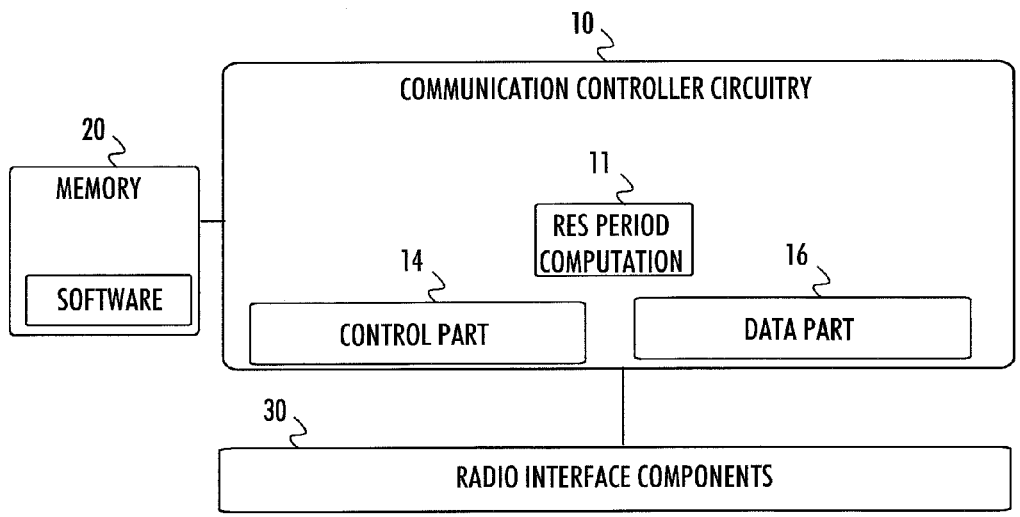
Fig 10

RESERVING TRANSMISSION RESOURCES IN WIRELESS NETWORK

RELATED APPLICATION

This application was originally filed as PCT Application No. PCT/FI2011/050141 filed Feb. 15, 2011.

FIELD

The invention relates to the field of wireless telecommunications and, particularly, to reserving transmission resources in a wireless communication system.

BACKGROUND

Wireless Local Area Network (WLAN) has undergone vast development in order to increase throughput. Task groups such as 802.11b, 802.11a, 802.11g and 802.11n have demonstrated continuous improvement of the WLAN radio throughput. 802.11ac is another task group that is developing the WLAN radios that operate at a frequency spectrum below 6 GHz and especially at 5 GHz. There exist other task groups within the IEEE 802.11 standardization.

BRIEF DESCRIPTION

Embodiments are presented for determining a reservation period for data transmission in a wireless communication network. The duration of the reservation period may be determined on the basis of a handshake between a transmitter and a receiver apparatus.

LIST OF DRAWINGS

Embodiments of the present invention are described below, by way of example only, with reference to the accompanying drawings, in which FIGS. 1A and 1B illustrate an example of a wireless communication system to which embodiments of the invention may be applied;

FIGS. 2A and 2B illustrate a flow diagram of a process according to an embodiment of the invention;

FIGS. 8A and 9A illustrate flow diagrams of processes for carrying out the channel query during a probing phase;

FIGS. 8B and 9B illustrate flow diagrams of processes for computing the duration of the reservation period; and FIG. 10 illustrates a block diagram of an apparatus according to an embodiment of the invention.

DESCRIPTION OF EMBODIMENTS

Figure 3:
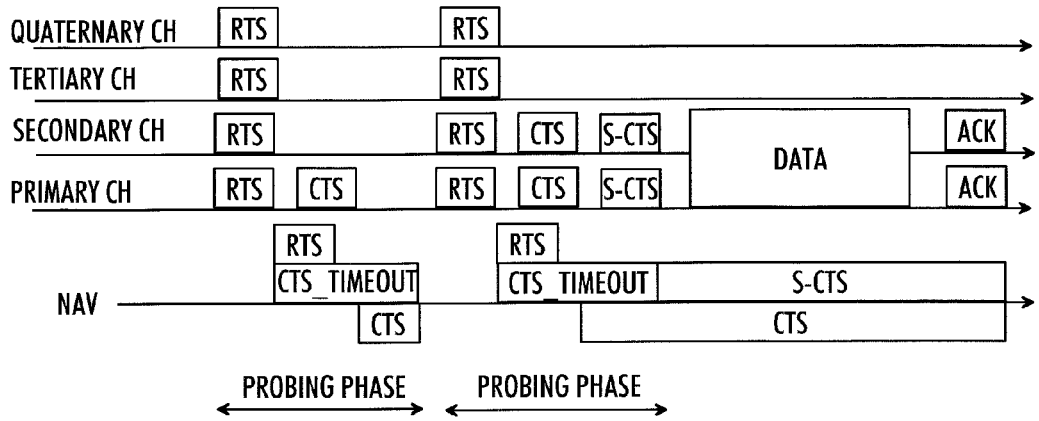
FIGS. 3 to 7 illustrate embodiments for carrying out a channel query procedure and computing a reservation period for subsequent data transmission according to some embodiments of the invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

A general architecture of a wireless telecommunication system to which embodiments of the invention may be applied is illustrated in FIG. 1A. FIG. 1A illustrates two groups of wireless communication devices forming two basic service sets, i.e. groups of wireless communication devices comprising an access point (AP) 100, 112 and terminal stations (STA) 102, 104, 110, 114 communicating with the access points 100, 112 of their respective groups. A basic service set (BSS) is a basic building block of an IEEE 802.11 wireless local area network (WLAN). The most common BSS type is an infrastructure BSS that includes a single AP together with all associated STAB. The AP may be a fixed AP as AP 112, or it may be a mobile AP as AP 100. The APs 100, 112 may also provide access to other networks, e.g. the Internet 120. In another embodiment, at least one of the BSSs is an independent BSS (IBSS) or a mesh BSS (MBSS) without a dedicated AP, and in such embodiments the communication device 100 may be a non-access-point terminal station. While embodiments of the invention are described in the context of the above-described topologies of IEEE 802.11 and, particularly, IEEE 802.11ac, it should be appreciated that other embodiments of the invention are applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

The 802.11n specifies a data transmission mode that includes 20 MHz wide primary and secondary channels. The primary channel is used in all data transmissions, and with clients supporting only the 20 MHz mode. A further definition in 802.11n is that the primary and secondary channels are adjacent. The 802.11n specification also defines a mode in which a STA can have only one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. FIG. 1B illustrates an exemplary channel structure for 20 MHz, 40 MHz, 80 MHz, and 160 MHz channels. In this example, a 40 MHz transmission band is formed by two contiguous 20 MHz bands (denoted by numerals 1 and 2 in FIG. 1B), and an 80 MHz transmission band is formed by two contiguous 40 MHz bands (numerals 1, 2, 3). However, a 160 MHz band may be formed by two contiguous (numerals 1 to 4) or non-contiguous 80 MHz bands (numerals 1 to 3 for a first 80 MHz band and any one of bands denoted by numerals 5 and 6 for a second 80 MHz band).

As mentioned above, the transmission band of a BSS contains the primary channel and zero or more secondary channels. The secondary channels may be used to increase data transfer capacity of the TXOP. The secondary channels may be called a secondary channel, a tertiary channel, a quaternary channel, etc. The primary channel may be used for channel contention, and a transmission opportunity (TXOP) may be gained after successful channel contention on the primary channel. Every STA is reducing a backoff value while the primary channel is sensed to be idle for a certain time interval, for instance 9 microseconds. When the backoff reaches zero, the STA gains the TXOP and starts transmission. If another STA gains the TXOP before that, the channel sensing is suspended, and the STA proceeds with the channel sensing after the TXOP of the other STA has ended. The time duration (the backoff factor) may not be reset at this stage, and the time duration that already lapsed before the suspension is also counted, which means that the STA now has a higher probability of gaining the TXOP. A secondary channel may be used in the transmission if it has been free for a determined time period (may be the same or different time period than that used for gaining the TXOP) just before TXOP start time in order for the contending STA to take the secondary channel in use.

A virtual carrier sensing function is provided by the provision of a network allocation vector (NAV) which is used to reserve a channel. Most of the transmitted frames comprise a duration field which can be used to reserve the medium (or provide duration of the NAV protection) for the duration indicated by the value of the duration field. In practice, the NAV is a timer that indicates the amount of time the medium will be reserved. In a typical operation, the transmitting and receiving stations (STAB) will set the NAV to the time for which they expect to use the medium while other STAB count down from the NAV to zero before starting the channel contention. The virtual carrier sensing function indicates that the medium is busy when NAV is non-zero and idle when NAV is zero. The NAV may be set to protect frames communicated on the primary channel of the BSS.

A TXOP holder (a wireless communication apparatus that has won the channel contention) may probe for available channels in the location of the receiver through a query procedure. During the query procedure, the TXOP holder transmits a transmission request message, e.g. a Request-to-Send message, to the receiver on every channel included in the query, and the receiver responds with a transmission response message, e.g. a Clear-to-Send message, on the channels it detects to be free. The CTS message is a response to the RTS message, and it may also be used to set the NAV protection. The CTS message also comprises a duration field used in a similar manner as with the RTS message. Then, the TXOP holder may carry out the transmission on the free channels. The transmission request message and/or the transmission response message may be used to set the NAV protection. FIGS. 2A and 2B illustrate embodiments for computing a reservation period, e.g. the NAV duration, for the TXOP on the basis of the RTS/CTS handshake procedure. FIG. 2A illustrates a procedure where a wireless communication apparatus transmits one or more RTS messages and computes the reservation period, and FIG. 2B illustrates a procedure where a receiver of the RTS message computes the reservation period.

Referring to FIG. 2A, the process starts in block 200. In block 202, a wireless communication apparatus has reduced the backoff factor to zero and, thus is able to gain the TXOP. For that purpose, the wireless communication apparatus is caused to transmit a transmission request message to a second wireless communication apparatus on a plurality of channels at a beginning of the TXOP. The transmission request message is used to query whether or not at least one of said plurality of channels is free, and the transmission request message may be used to trigger a first reservation period to said plurality of channels. The first reservation period may be a short probing duration having a length less than or equal to CTS_Timeout parameter plus the duration of at least a following message in the IEEE 802.11ac network, or it may have another duration. The transmission request message may be the RTS message comprising a duration field that sets the NAV on the channels on which the RTS is transmitted. The RTS may be transmitted as a result of channel sensing, e.g. through clear-channel assessment (CCA), on those channels detected to be free (idle) in the wireless communication apparatus. In block 204, the wireless communication apparatus receives a transmission response message as a response to the transmission request message from the second wireless communication apparatus. The transmission response message indicates the channel(s) on which the RTS message was received and detected to be free by the second wireless communication apparatus through the CCA, for example. As a consequence, the RTS/CTS handshake enables determination of the channel(s) that are free around both the transmitter and the receiver. When the duration field of the RTS frame contains a short probing duration, the NAV reservation enables the wireless communication apparatus gaining the TXOP to proceed with a longer reservation or to discontinue the TXOP and free the channel access to other device with a minimum unnecessary duration of channel reservation. This will be discussed in greater detail below.

In block 206, duration for a second reservation period is computed in the wireless communication apparatus on the basis of the number of channels indicated to be free in the transmission response message with respect to the number or a subset of said plurality of channels on which the transmission request message was transmitted. The second reservation period is computed to be longer in a case where all the channels are not free than in a case where all the channels are free. In block 208, the wireless communication apparatus is caused to reserve said at least one channel detected to be free according to the requirement of the TXOP holder for the second reservation period and to transmit data during said second reservation period. The process of FIG. 2A may occur during the same TXOP.

Referring to FIG. 2B illustrating the functionality of an intended receiver of the TXOP, the process starts in block 210. In block 212, a transmission request message is received in a wireless communication apparatus on a plurality of channels at a beginning of the TXOP. The transmission request message may be used to query whether or not at least one of said plurality of channels is free, and the transmission request message triggers a first reservation period to said plurality of channels. In block 214, a second reservation period is computed on the basis of the number of channels detected to be free with respect to the number of said plurality of channels on which the transmission request message was received. As was the case in the process of FIG. 2A, the second reservation period is computed to be longer in a case where all the channels are not free than in a case where all the channels are free. In block 216, the wireless communication apparatus is caused to transmit a transmission response message as a response to the transmission request message, wherein the transmission response message indicates at least one channel the second wireless communication apparatus has detected to be free, and wherein the transmission response message triggers reservation of said at least one channel detected to be free for the duration of the second reservation period. Thereafter, the wireless communication apparatus may receive data during the second reservation period and during the TXOP.

Computation of the reservation period on the basis of the channels that are detected to be free in both the transmitter and the receiver in response to the RTS/CTS handshake enables optimizing the duration of the reservation compared to a case where the transmitter itself computes the reservation period on the basis of channels it detects to be free. In some scenarios, at least some of the channels the transmitter detects to be free may be occupied in the receiver which leads to availability of less channels for the TXOP and increased duration of the reservation period. This may lead to under-allocation of the reservation period which is effectively solved by the embodiments of FIGS. 2A and/or 2B. On the other hand, if the transmitter prepares for the worst case scenario (only the primary channel being free) with respect to the occupation of the channels by maximizing the duration of the reservation, this may lead to over-allocation of the reservation period in a case where the more channels are actually free than in the worst-case scenario. This leads to poor spectral efficiency which is also effectively solved by the embodiments of FIGS. 2A and/or 2B. Accordingly, such embodiments provide means for adapting the reservation to a transmission bandwidth mismatch between the transmitter and the receiver of the TXOP. The transmission bandwidth mismatch refers to a mismatch between the channels the transmitter has detected to be free and the channels the receiver has detected to be free.

FIGS. 3 to 7 illustrate embodiments for carrying out the adaptation of the reservation. In some embodiments, the adaptation of the reservation period is computed in the transmitter of the TXOP, while in other embodiments the adaptation of the reservation period is computed in the receiver of the TXOP. It should be noted that in some embodiments both the transmitter and the receiver may support the adaptation of the reservation period, and the entity carrying out the adaptation may also be adaptively determined by the TXOP holder, for example. Therefore, some embodiments provide a wireless communication apparatus supporting the adaptation of the reservation period when it is the TXOP holder and when it is a receiver of a TXOP.

Referring to FIG. 3, let us consider an embodiment where the receiver carries out the adaptation of the reservation period. The embodiment of FIG. 3 utilizes a probing phase during which at least the RTS/CTS handshake is carried out. The probing phase defines a time duration exclusive to the RTS/CTS handshake, and actual data transmission may be performed outside the probing phase, as illustrated in FIG. 3. In some embodiments, the probing phase includes a period for transmitting another control message after the CTS message, as will become apparent from the description below. The probing phase may be carried out at the beginning of the TXOP and/or after transmission of some data during the TXOP. The probing phase enables the determination of available channels in both the transmitter (the TXOP holder) and the receiver and the determination of whether or not to carry out the data transmission by using the channels free in both the transmitter and the receiver. A static and a dynamic reservation type may be defined, wherein the static reservation type may refer to proceeding with the data transmission if all the channels indicated in the transmission request message are free also on the receiver side. The dynamic reservation type may refer to proceeding with the transmission when a subset of the channels indicated in the transmission request message is free on the receiver side. The reservation type may be indicated in the transmission request message. Upon gaining the TXOP, the TXOP holder transmits during a first probing phase the RTS message on the channels that it has detected to be free and intends to use in the TXOP for transmission of data to the receiver, e.g. the primary to quaternary channels as illustrated in FIG. 3. The RTS messages are addressed to the receiver or a plurality of receivers. A separate RTS message having the identical contents may be transmitted to the receiver on each channel, thereby separately requesting transmission on each channel. The RTS message may comprise a duration field defining the duration of the NAV protection for the channels on which the RTS message is transmitted. The NAV is verified and applied if the receiver(s) of the RTS frame transmit the CTS message within the CTS timeout. The CTS timeout is a duration during which all other devices except the device which receiver address was indicated in the RTS frame wait to receive CTS frame to RTS frame, i.e. these devices may not start to obtain TXOP or transmit during this time. The CTS timeout covers at least a following CTS message, and approximately the message following the CTS message, e.g. a CTS-to-self message described below.

Upon reception of the RTS message from the TXOP holder, the receiver may carry out CCA procedure, or may have carried out the CCA beforehand, and prepares the CTS message to be transmitted on those channel(s) detected to be free in the CCA procedure. The receiver may also take into account detected NAVs of other STAB on the channel(s) on which the RTS was received. In this case, the receiver detects that only the primary channel is free and, thus, transmits the CTS message on the primary channel only. In general, the receiver may transmit the CTS message only on those channels for which it detects no NAV protection by the other STAB. The CTS message may also comprise the duration field setting the duration of the NAV protection on the channel(s) on which the CTS is transmitted. In this case, since only the primary channel is free, the receiver may determine that the number of free channels is too low for carrying out the reservation of the channel(s) for the data transmission. This may be determined from a message received from the TXOP holder that defines whether to utilize the static or dynamic reservation type. With respect to the dynamic reservation type, a minimum number of free channels needed to carry out the data transmission may be defined in the RTS message, or it may be defined as a default value in the receiver, e.g. the number of free channels in the receiver with respect to the number free channels on which the RTS was received. For instance, if the RTS message has commanded the receiver to apply a static reservation type, e.g. commanded to reserve all resources, the receiver may compute the extended duration of NAV for CTS frame only if all the queried channels are sensed to be idle. If the RTS frame commands the dynamic reservation type, e.g. command to reserve any available resource, the receiver may determine that the TXOP proceeds to the data transmission and extend the duration of the NAV. The reserved duration may be scaled as function of reserved bandwidth, as will be described below. The reservation duration may be limited by a maximum time limit of the TXOP which may be defined by TXOPLimit parameter for each access category (AC). In response to determining to discontinue the reservation, the receiver may still transmit the CTS message to enable the TXOP holder to determine, on the basis of the CTS message received even though the data transmission is discontinued, correct reception of the RTS message and the number of the idle channels seen by the CTS transmitter and compute the duration field of the CTS message to define a time duration that ends at the same time as the NAV setting defined by the RTS message. The duration may thus be computed from the value of the duration field of the received RTS message as follows:

$$NAV_{CTS} \begin{cases} = CTS\_Timeout + \delta, \text{ probing, fail} \\ = NAV_{RTS} * 32 \ \mu s, \text{ probing, success} \\ = NAV_{RTS} - (CTS + SIFS), \text{ reservation} \end{cases} \quad (1A)$$

$$NAV_{RTS} \begin{cases} \leq CTS\_Timeout + \delta, \text{ probing} \\ > CTS\_Timeout + \delta, \text{ reservation} \end{cases} \quad (1B)$$

$NAV_{RTS}$ is the duration defined in the duration field of the RTS message which may be used to trigger the probing operations as shown in Equation (1B), CTS_Timeout is the duration during which the CTS frame (or at least its preamble) should be received as a response to the RTS message in order to validate the NAV protection defined in the duration field of the RTS message, $\delta$ is the duration of a subsequent CTS-to-self or a further RTS message, as will be described below. In one embodiment, $\delta$ may be set to zero. CTS is the duration of the CTS message, and SIFS (short inter-frame space) is a guard period that may be provided between the RTS and CTS messages and commonly used in IEEE 802.11 networks. Then, the receiver may transmit the CTS message to the TXOP holder. Equation 1A includes three options from which one is selected on the basis of the command to either carry out the reservation or the probing (Defined by the value of the duration field in the RTS message. From the two options related to the probing, one is selected on the basis of whether or not the number of detected channels is sufficiently high to result in the data transmission (explained above with respect to the static/dynamic reservation types). If the data transmission is not carried out, the receiver computes the NAV protection to start from the transmission of the CTS message and end at the same time the CTS_Timeout ends (probing, fail in Equation 1A). If the data transmission is carried out (probing, success in Equation 1A) the receiver may compute the NAV protection to extend the duration indicated in the RTS message. In this example, the duration of the NAV protection defined in the RTS message is scaled (multiplied), although in other embodiments, the extension may be carried out through adding a determined time period. As illustrated in FIG. 3, the NAV protection of the RTS message may be shorter than the CTS_Timeout, and the NAV protection of the CTS message may either be limited by the CTS_Timeout or the amount of extension.

In this example, the first probing phase results in the failed probing, as only the primary channel was free. Thus, the receiver returns the CTS message with the duration ending within the CTS-Timeout. Upon reception of the CTS message in the TXOP holder, the TXOP holder also determines to discontinue with the reservation and end the first probing phase. As already mentioned, the value of the $NAV_{RTS}$ parameter may be used to indicate to the receiver of the RTS message whether the probing is being carried out without any intention to transmit data yet or whether the reservation is intended to cover the data transmission. Detailed embodiments are discussed below.

Subsequently, the TXOP holder may determine to carry out another probing phase by transmitting the RTS messages on the same channels (channels it detects to be free). This may follow the above-described principle, and the NAV set by the RTS message may again cover only the probing phase. Now, the receiver detects that the secondary channel is also free and, thus, determines to proceed to channel reservation for the data transmission. Now, the receiver may compute the duration of the reservation for data transmission in the second reservation phase, e.g. to the end of the data transmission. The receiver may now calculate the new $NAV_{CTS}$ as follows:

$$NAV'_{CTS} = NAV_{CTS} + 2 \times SIFS + W \times T + ACK \quad (2)$$

where W is a coefficient defined according to the number of channels the receiver determined to be free with respect to the number of channels on which the RTS message was received. T defines a default duration for the data transmission when all the channels on which the RTS was received are free. As a consequence, the coefficient scales the duration in proportion to the decrease of free channels. For example, when the number of actually free channels is half of the number of channels on which the RTS message was received, the coefficient may take the value of two. In practice, the scalability may not be so straightforward because a higher number of channels utilized also provides a higher MAC layer signaling overhead and decreases the transmission power density making the received signal to have a lower power level. Therefore, the coefficient may also take another value, e.g. 1.5. The value of the scaling coefficient may be determined according to the system design and according the rate adaptation logic that selects a modulation and coding scheme according to link conditions. ACK defines the duration of an acknowledgment message. The computation of the $NAV'_{CTS}$ may also take into account the SIFS periods between the frames. To account for the decision whether or not to proceed with the channel reservation, a decision may be made whether to compute Equation (1A) and, if not all requested channels were reserved the Equation (2) is used, or, from another point of view, whether to omit term ($2 \times SIFS + W \times T + ACK$) from Equation (2). Equation (2) may be an alternative to the "probing success" and/or "reservation" options of Equation (1A).

The value of the $NAV'_{CTS}$ is then inserted into the duration field of the CTS message, and the CTS message is transmitted on the channels the receiver detected to be free (the primary and the secondary channels in this example), thereby triggering the NAV protection to those channels in the coverage area of the receiver. Upon reception of the CTS message, the TXOP holder computes the remaining length of the NAV protection as follows:

$$NAV_{S\text{-}CTS} = NAV'_{CTS} - (SCTS + SIFS) \quad (3)$$

wherein SCTS defines the length of a CTS message the TXOP holder subsequently transmits. The CTS message is addressed to the TXOP holder itself, and such a CTS message is called CTS-to-self message. A separate copy of the SCTS message may be transmitted on every 20 MHz channel similarly as CTS and RTS messages. The CTS-to-self message is arranged to comprise the remaining length of NAV protection computed in Equation (3) so as to carry out the NAV protection also in the coverage area of the TXOP holder. The TXOP holder may skip the transmission of the SCTS and proceed to transmit data to the receiver on the channels negotiated to be free, and receives acknowledgment upon successful reception of the data, as illustrated in FIG. 3.

Figure 4:
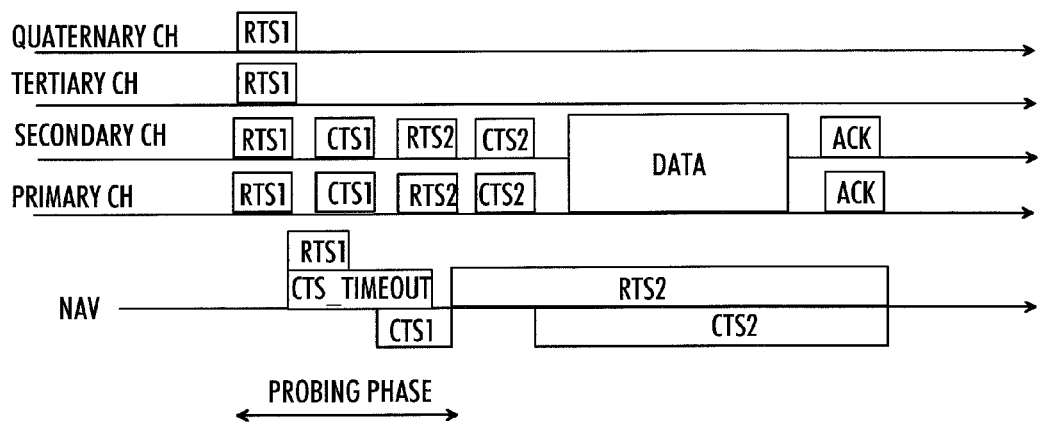

FIG. 4 illustrates an embodiment utilizing the probing, wherein the TXOP holder computes the reservation period according to the number of commonly available channels. In this embodiment, the TXOP holder transmits the RTS message on the channels it detects to be free, and it sets the duration field of the RTS message to cover the subsequent CTS message and the subsequent message, as illustrated in FIG. 4. The subsequent message is in this case another RTS message instead of CTS-to-self message. Upon reception of the RTS message from the TXOP holder, the receiver detects the free channels, computes the duration field for the CTS message according to Equation (1A), and transmits the CTS message to the TXOP holder on the free channels (the primary and the secondary channel in this case, too). Upon reception of the CTS message, the TXOP holder determines whether or not to proceed. Let us assume that the number of commonly free channels is sufficient and that the reservation continues. The transmitter now computes a value for the duration field of an RTS message to be transmitted such that it covers a subsequent, CTS message following the RTS message, data transmission period on the commonly free channels, and the subsequent acknowledgment period. Then, the TXOP holder transmits the RTS message that sets the NAV in the coverage area of the TXOP holder. Upon reception of the RTS message, the receiver again computes the duration field for the CTS message according to Equation (1A) and then inserts the remaining duration in the duration field of the CTS message transmitted to the TXOP holder. Accordingly, the NAV setting provided by the CTS message is arranged to end at the same time with the NAV setting provided by the RTS message. Upon reception of the CTS message in the TXOP holder, the TXOP holder carries out the data transmission, as described above.

Figure 5:
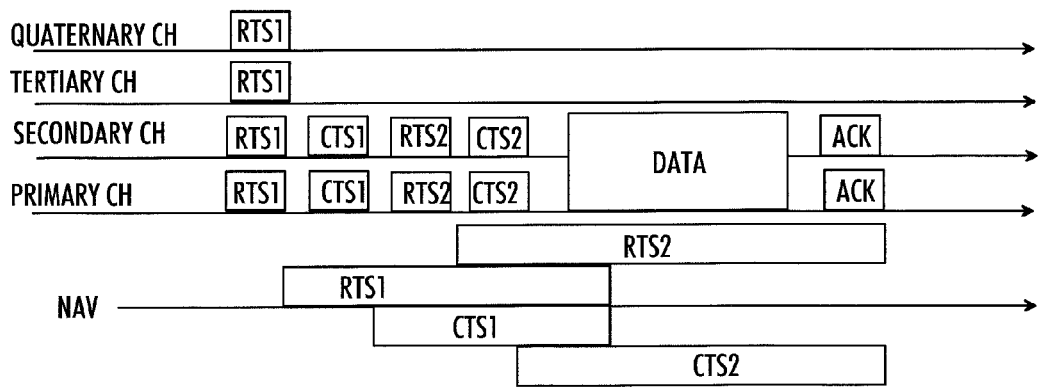

FIG. 5 illustrates an embodiment without the separate probing phase, wherein the TXOP holder adapts to the transmission bandwidth mismatch with the receiver by recomputing the duration of the reservation period. The TXOP holder may determine the channels that are free and compute the duration of the reservation period on the basis of the number of free channels. In this example, the TXOP holder detects that primary to quaternary channels are free and, thus, it computes the duration of the reservation period according to the following Equation, and inserts a resulting value to the duration field of a first RTS message transmitted to the intended receiver:

$$NAV_{RTS}=3\times SIFS+CTS+DATA+ACK, \quad (4)$$

where DATA is the transmission time of the data frame based on the available transmission bandwidth, i.e., the number of free channels. The NAV set in this manner is illustrated in FIG. 5 by "RTS1". However, the receiver observes that only the primary and secondary channels are free and, thus, transmits a CTS message only on those channels. The receiver may compute the NAV duration according to Equation (1A) and include it in the duration field of the CTS message. Upon detection that the number of commonly free channels is lower than the TXOP holder initially detected, resulting in under-allocation of the NAV protection, the TXOP holder determines to extend the NAV protection and recomputes the duration of the reservation period according to the number of commonly free channels (e.g. 2 in this example) and transmits a second RTS message (RTS2 in FIG. 5) with the recomputed duration according to Equation (4). Thus, the TXOP holder extends the NAV protection appropriately, as illustrated by RTS2 in the NAV protection line in FIG. 5. The second RTS may be transmitted only on the channels that the receiver reported to be free. Upon reception of the second RTS message, the receiver acknowledges the RTS message by a second CTS message for which the NAV protection is computed according to Equation (1A) again, thereby providing the same NAV protection in the coverage area of the receiver, as illustrated by CTS2 in the NAV protection line in FIG. 5. As a consequence, this embodiment provides the TXOP holder with means for adapting to the transmission bandwidth mismatch between the TXOP holder and the receiver, thus avoiding the erroneous NAV protection.

Figure 6:
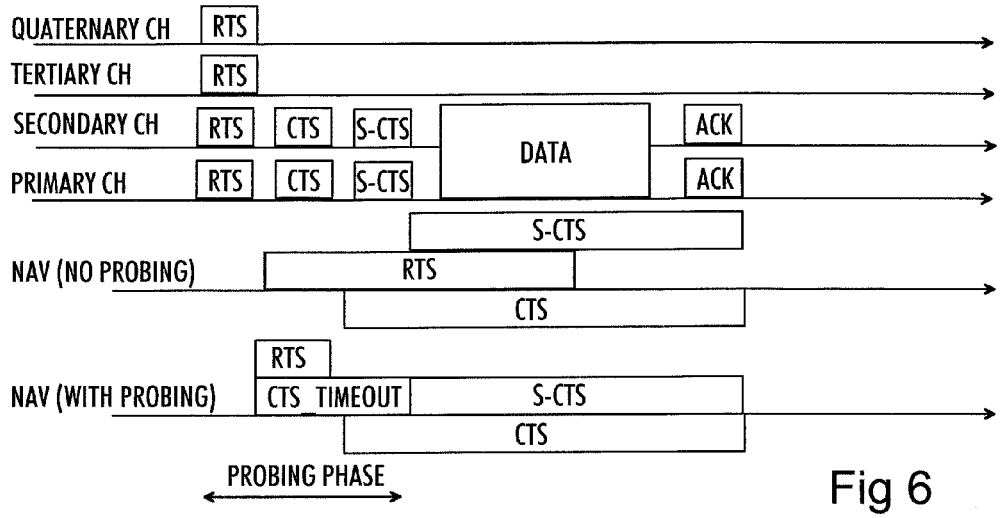

FIG. 6 illustrates two embodiments (with and without the separate probing phase), wherein the receiver adapts to the transmission bandwidth mismatch with the receiver by recomputing the duration of the reservation period. In both cases, the TXOP holder transmits the RTS message as described above, receives from the receiver a CTS message on the commonly free channels. The CTS message comprises the computed duration of the reservation period that extends to cover the data transmission and, thereafter, the TXOP holder transmits the CTS-to-self message to announce the NAV protection in its coverage area before the actual data transmission.

Let us first consider the embodiment with no separate probing phase. The TXOP holder computes the duration of the NAV protection according to the number of channels it detects to be free according to Equation (4), and transmits the RTS message defining the computed duration for the NAV protection. However, as the receiver detects the transmission bandwidth mismatch, it computes the duration for the NAV protection according to Equation (5a) and includes the result in the CTS message transmitted on the free channels:

$$NAV'_{CTS}=3\times SIFS+SCTS+W\times T+ACK \quad (5A)$$

$$NAV'_{CTS}=2\times SIFS+W\times T+ACK \quad (5B)$$

Note that Equation (5b) may be used instead for the case without transmission bandwidth mismatch.

Upon reception of the CTS message, the TXOP holder may recompute the duration for the NAV protection according to Equation (3) and transmit the CTS-to-self message to announce the new NAV protection in its coverage area.

With respect to the embodiment with the probing phase, the TXOP holder may compute the duration of the NAV protection of the RTS message to cover only the probing phase which includes the transmission of the CTS message and the CTS-to-self message but excluding the time for data transmission. This NAV protection is then indicated in the RTS message, or the TXOP holder may set the duration field of the RTS message to indicate the duration less than the CTS_Timeout, as illustrated in FIG. 6. In the latter case, the TXOP holder relies on the CTS_Timeout to protect the CTS message and the subsequent CTS-to-self message. Upon reception of the RTS message, the receiver again detects the transmission bandwidth mismatch, computes the duration for the NAV protection according to Equation (2) and includes the result in the CTS message transmitted on the free channels. Upon reception of the CTS message, the TXOP holder may recompute the duration for the NAV protection according to Equation (3) and transmit the CTS-to-self message to announce the new NAV protection in its coverage area.

In some cases, the receiver may prevent the extension of the NAV protection. For instance, if the TXOPLimit parameter prevents the extension, the extension may be omitted, and the receiver may respond with the CTS message without the extension of the NAV protection. The extension of the NAV protection may be prevented for other reasons as well.

Figure 7:
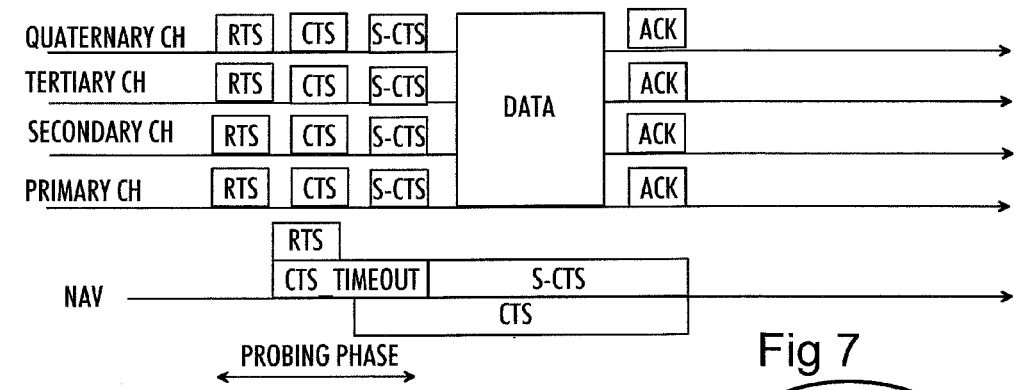

FIG. 7 illustrates an embodiment with the probing phase where the transmission bandwidth mismatch does not occur and where the receiver computes the duration for the NAV protection covering the time for data transmission. In this embodiment, the TXOP holder transmits the RTS message on the free channels, wherein the NAV protection provided by the RTS message covers only the probing phase, e.g. through the CTS_Timeout. Upon reception of the RTS message and determining that all the channels on which the RTS message was received are free, the receiver computes the duration of the reservation period that covers the data transmission according to Equation (2) where the scaling coefficient W is set to be one. The resulting value is inserted in the duration field of the CTS message transmitted to the TXOP holder, and the TXOP holder, transmits the CTS-to-self message with the NAV protection computed according to Equation (3).

It should be noted that the adaptation of those channels that the TXOP holder detected to be free but that were not commonly free, may be arranged to avoid over-allocation of the NAV protection by providing a mechanism where an RTS message should be responded with the CTS message within a determined time duration in order to affect the NAV protection defined in the duration field of the RTS message. With respect to a third party wireless communication apparatus detecting the RTS message transmitted from the TXOP holder to the receiver on a given channel, if it detects also a CTS message which is a response to the RTS message on that channel, it applies the NAV protection of the RTS message and avoids the channel for the duration of the NAV protection. However, if it does not detect the CTS message in response to the RTS message on that channel, it may reset its NAV after a determined time period has expired after the detection of the RTS message. This time period is shorter than the duration of the NAV protection, and it may be 2×SIFS+CTS+PHY-RX-START-Delay+(2×SlotTime). CTS is the duration of the CTS message, and parameters PHY-RX-START-Delay and SlotTime (duration of a time slot) are constant values defined by system specifications, e.g. IEEE 802.11ac specifications. THE PHY-RX-START-Delay is the time needed to transmit a legacy 802.11a synchronization preamble and a PLOP header. Synchronization is 16 microseconds and PLOP header 4 microseconds.

As mentioned above, an apparatus according to an embodiment of the invention supports the adaptation of the reservation period both when it is the TXOP holder and when it is the receiver. For the purpose of controlling which party carries out the adaptation on the basis of commonly free channels, one may use the duration field of the RTS message to carry an implicit command indicating whether or not the receiver of the RTS message should compute the reservation period. As mentioned above, the duration field of the RTS message is set to cover at least the subsequent CTS message. In the IEEE 802.11ac system, the RTS message inherently sets the NAV protection at least for the duration of the CTS message, e.g. the above-mentioned duration 2×SIFS+CTS+PHY-RX-START-Delay+(2×SlotTime). During this time, all STAB except the receiver of the RTS frame wait for detection of the CTS frame. It may be assumed that this duration is at least 62 µs. The delay after which the channel access may be performed may only be increased and, therefore, providing the duration field with a value below 62 (or 60) µs has no function with respect to the channel reservation, and such values may be used as control values for another purpose, e.g. to indicate which one of the TXOP holder and the receiver should compute the duration of the reservation period. In an embodiment, a value of the duration field below 62 (or generally a determined value) commands the receiver to compute the duration of the reservation period for the data transmission, e.g. one of the embodiments of FIGS. 3, 6, and 7. On the other hand, a value of the duration field above 62 (or generally the determined value) informs the receiver that the TXOP holder computes the duration of the reservation period for the data transmission, e.g. one of the embodiments of FIGS. 4 and 5. The duration for probing may be communicated by adding a constant extra time to duration field of the RTS frame. For instance, the constant extra time may be 100 microseconds or the value of the CTS_Timeout parameter. In this embodiment, the receiver that formulates the CTS message first decreases the extra constant time when calculating the duration value from the value of the duration field of the RTS message. From another point of view, a value of the duration field within a first range commands the receiver to compute the reservation period, while a value of the duration field within a second range not overlapping with the first range informs the receiver that the TXOP holder computes the reservation period. From yet another point of view, a first value of the duration field commands the receiver to compute the reservation period, while a second value different from the first value informs the receiver that the TXOP holder computes the reservation period. On the basis of the value of the duration field, the receiver may then execute an appropriate procedure according any above-described embodiment.

Let us assume that a determined value of the duration field of the RTS message configured the receiver to compute the reservation period for the data transmission, e.g. 60, and that there is no transmission bandwidth mismatch which means that all the channels on which the RTS message was received are commonly free channels (see FIG. 7). Then, the receiver may be configured to utilize a Default Reservation Step parameter defined by the specifications or configured internally in the BSS to scale the value of the duration field. The value of the Default Reservation Step may be 16 or 32 µs, for example. In the case of no transmission bandwidth mismatch, the receiver may simply multiply the value of the duration field of the RTS message with the Default Reservation Step parameter instead of computing Equation (2). For example, multiplication of 60 by 16 µs results in the reservation period of 960 µs. On the other hand, if only half of the channels on which the RTS was received are commonly free channels, the receiver may scale the value of the duration field accordingly. For example, if only half of the channels are commonly free, the duration of the reservation may be computed as 60*16 µs*2=1.92 ms (see Equation (1A), probing success).

Similarly, the apparatus according to an embodiment of the invention may support operation with and without the probing phase, wherein the presence or absence of the probing phase may also be defined by the TXOP holder by setting the value of the duration field of the RTS message appropriately. A short duration (within a determined range) indicates that only the RTS/CTS handshake is protected and that the protection is confined within the probing phase. In addition, the TXOP holder has the option to continue or discontinue with medium reservation while the receiver has the capability to extend NAV protection according to Equation (2). On the other hand, a long duration (within another range over the shorter range) indicates that the protection extends to the time for data transmission and no separate probing phase is carried out. A long duration may range from 150 µs or a few hundreds of µs to a few ms, e.g. 3 ms.

Figure 8A:
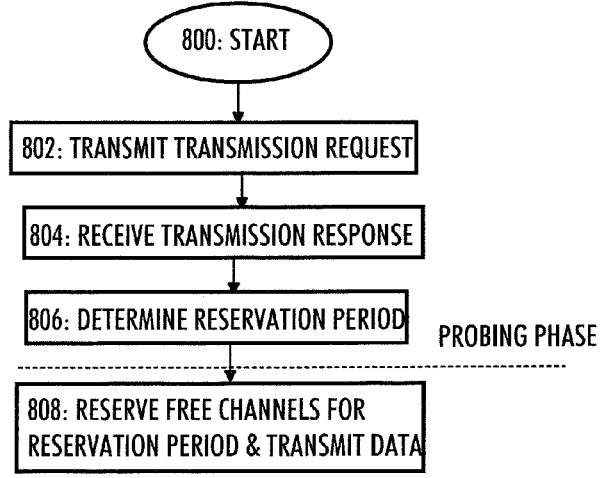
Figure 8B:
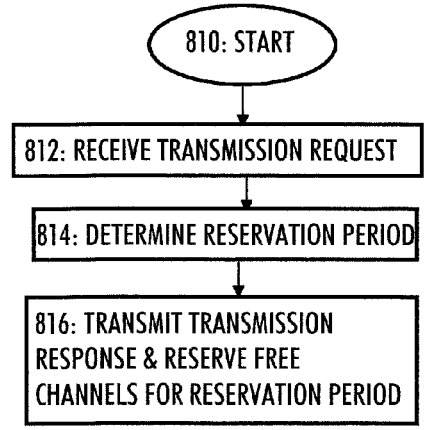

The concept of the embodiments utilizing the probing phase may be generalized into processes executed in the TXOP holder and in the receiver as illustrated by flow diagrams of FIGS. 8A and 8B, respectively. The TXOP is separated into a probing phase and data transmission following the probing phase, as illustrated by the dashed line in FIG. 8A. Referring to FIG. 8A illustrating the operation of a wireless communication apparatus functioning as the TXOP holder, the process starts in block 800. In block 802, the wireless communication apparatus is caused to transmit during the probing phase a transmission request message to a second wireless communication apparatus on a plurality of channels. The transmission request message is used to query whether or not at least one of said plurality of channels is free, and the transmission request message triggers a first reservation period to said plurality of queried channels. The first reservation period may be confined to the probing phase, e.g. it does not extend to data transmission. In block 804, a transmission response message is received as a response to the transmission request message during the probing phase, wherein the transmission response message indicates at least one channel the second wireless communication apparatus has detected to be free. In block 806, the duration of a second reservation period is determined on the basis of the received transmission response message, wherein the second reservation period extends to the time for data transmission and is longer in a case where at least one of said plurality of queried channels is detected not to be free than in a case where said plurality of queried channels are all detected to be free. In block 808, the wireless communication apparatus is caused to reserve said at least one channel detected to be free for the second reservation period and to begin data transmission.

Referring to FIG. 8B illustrating the operation of a wireless communication apparatus functioning as the receiver during the TXOP, the process starts in block 810. In block 812, a transmission request message is received during the probing phase on a plurality of channels, wherein the transmission request message is used to query whether or not at least one of said plurality of channels is free, and wherein the transmission request message triggers a first reservation period to said plurality of channels. As mentioned above, the first reservation period may be confined to the probing phase. In block 814, the duration of a second reservation period is determined during the probing phase, wherein the second reservation period extends to the time for data transmission and is longer in a case where at least one of said plurality of channels is detected not to be free than in a case where said plurality of channels are all detected to be free. In block 816, the wireless communication apparatus is caused to transmit a transmission response message as a response to the transmission request message during the probing phase, wherein the transmission response message indicates at least one channel the second wireless communication apparatus has detected to be free. Blocks 814 and 816 may be executed in any order depending on whether the TXOP holder or the receiver computes and indicates the duration of the second reservation period to the other party.

The concept of the embodiments where the duration of the reservation period is determined on the basis of the RTS/CTS handshake and optionally utilizing the probing phase may be generalized into processes executed in the TXOP holder and in the receiver as illustrated by flow diagrams of FIGS. 9A and 9B, respectively.

Referring to FIG. 9A illustrating the operation of a wireless communication apparatus functioning as the TXOP holder, the process starts in block 900. At a beginning of a transmission opportunity in block 902, the wireless communication apparatus is caused to transmit a transmission request message to a second wireless communication apparatus on a plurality of channels, wherein the transmission request message is used to query whether or not at least one of said plurality of channels is free, and wherein the transmission request message triggers a reservation period to said plurality of channels. In block 904, a transmission response message is received as a response to the transmission request message, wherein the transmission response message indicates at least one channel the second wireless communication apparatus has detected to be free. In block 906, a new duration of the reservation period is derived on the basis of a transmission bandwidth mismatch between the number of channels detected to be free with respect to the number of said plurality of channels on which the transmission request message was transmitted, wherein the new duration of the reservation period extends to the time for data transmission and is longer in a case where at least one of said plurality of channels is detected not to be free than in a case where said plurality of channels are all detected to be free. In block 908, the wireless communication apparatus is caused to transmit a message that defines the derived duration for reserving said at least one channel detected to be free and transmitting data during said reservation period on said at least one channel detected to be free.

Referring to FIG. 9B illustrating the operation of a wireless communication apparatus functioning as the receiver during the TXOP, the process starts in block 910. In block 912, a transmission request message is received on a plurality of channels at a beginning of the TXOP. The transmission request message is used to query whether or not at least one of said plurality of channels is free, and the transmission request message triggers a reservation period to said plurality of channels. In block 914, a new duration of the reservation period is derived on the basis of a transmission bandwidth mismatch between the number of channels detected to be free with respect to the number of said plurality of channels on which the transmission request message was received, wherein the new duration of the reservation period extends to the time for data transmission and is longer in a case where at least one of said plurality of channels is detected not to be free than in a case where said plurality of channels are all detected to be free. In block 916, the wireless communication apparatus is caused to transmit a transmission response message as a response to the transmission request message, wherein the transmission response message indicates at least one channel the second wireless communication apparatus has detected to be free and the new duration of the reservation period. Thereafter, data may be received during the reservation period and during the TXOP.

FIG. 10 illustrates an embodiment of an apparatus comprising means for carrying out the above-mentioned functionalities of the TXOP holder and/or the receiving STA. The apparatus may be a communication apparatus of an IEEE 802.11 network or another wireless network, e.g. an AP or STA. The communication apparatus may be a computer (PC), a laptop, a tabloid computer, a cellular phone, a palm computer, a fixed base station operating as the AP, or any other communication apparatus. In another embodiment, the apparatus is comprised in such a communication apparatus, e.g. the apparatus may comprise a circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 10 may comprise a control part 14 handling control signaling communication with respect to transmission, reception, and extraction of control frames including the transmission request messages and the transmission response messages, as described above. The communication controller circuitry 10 may further comprise a data part 16 that handles transmission and reception of payload data during transmission opportunities of the communication apparatus (transmission) or transmission opportunities of other communication apparatuses (reception). The communication controller circuitry 10 further comprise a reservation period computation circuitry 11 configured to carry out the computation of the reservation period on the basis of the commonly free channels detected during the RTS/CTS handshake. The algorithm used for the computation of the reservation period may be controlled by the communication controller circuitry on the basis of whether or not the apparatus functions as the TXOP holder or the receiver. Additional criteria may be used to select the algorithm, e.g. whether or not to utilize the probing phase. Detailed embodiments related to the computation of the reservation periods, according to which the reservation period computation circuitry may operate, are described above.

The circuitries 11 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 11 to 16 or all of them.

The apparatus may further comprise the memory 20 that stores computer programs (software) configuring the apparatus to perform the above-described functionalities of the communication device. The memory 20 may also store communication parameters and other information needed for the wireless communications. The apparatus may further comprise radio interface components 30 providing the apparatus with radio communication capabilities within the BSS and with other BSSs. The radio interface components 30 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of any one of the processes of FIGS. 2A, 2B, 8A, 8B, 9A, and 9B. In further embodiments, the at least one memory and the computer program code are configured, with the at least one processor, to cause the apparatus to carry out any one of the embodiments related to processing the reservation period on the basis of the RTS/CTS handshake, as described above in connection with FIGS. 2A to 9B. Accordingly, the at least one processor, the memory, and the computer program code form processing means for carrying out embodiments of the present invention in the wireless communication apparatus.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2A to 9B may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. For example, the receiver of the RTS/CTS handshake may be another apparatus than the intended receiver of the data transmission, and the TXOP holder may transmit the data to another apparatus. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   querying which of a plurality of channels are free via a transmission request message transmitted on the plurality of channels from a first wireless communication apparatus to a second wireless communication apparatus, wherein the transmission request message comprises a duration field that defines a duration of a first reservation period of the plurality of channels;
   receiving a transmission response message as a response to the transmission request message, wherein the transmission response message indicates at least one of the plurality of channels the second wireless communication apparatus has detected to be free;
   determining a duration of a second reservation period that ends after the first reservation period based on the received transmission response message, wherein the second reservation period extends to cover a data transmission, and wherein the duration of the second reservation period is determined to be longer in a case where not all of the plurality of channels are detected to be free than in a case where all of the plurality of channels are detected to be free; and
   causing the first wireless communication apparatus to reserve the at least one of the plurality of channels detected to be free for the second reservation period and to transmit data during the second reservation period.

2. The method of claim 1, wherein the transmission of the transmission request message and the reception of the transmission response message are carried out during a probing phase, wherein the duration of the first reservation period is confined to the probing phase, and wherein the duration of the second reservation period extends to protect the data transmission.

3. The method of claim 1, further comprising:
in response to the reception of the transmission response message, determining based on a number of the at least one of the plurality of channels detected to be free to proceed to the data transmission and to carry out the reservation of the at least one of the plurality of channels detected to be free and to the determination of the duration of the second reservation period.

4. The method of claim 1, further comprising:
computing the duration of the second reservation period based on a number of the at least one of the plurality of channels detected to be free with respect to a number of the plurality of channels on which the transmission request message was transmitted;
causing the first wireless communication apparatus to transmit a second transmission request message comprising an information element identifying the duration of the second reservation period;
receiving a second transmission response message from the second wireless communication apparatus in response to the second transmission request message; and
in response to the reception of the second transmission response message, causing the first wireless communication apparatus to transmit the data to the second wireless communication apparatus during the second reservation period.

5. The method of claim 1, further comprising:
reading the duration of the second reservation period from the received transmission response message;
computing a currently remaining duration of the second reservation period; and
causing the first wireless communication apparatus to transmit another transmission response message destined to the first wireless communication apparatus itself and comprising an information element identifying the currently remaining duration of the second reservation period, thereby effecting reservation of the at least one of the plurality of channels detected to be free in a coverage area of the first wireless communication apparatus.

6. A method, comprising:
receiving, in a wireless communication apparatus, a transmission request message on at least one channel, wherein the transmission request message is used to query which of a plurality of channels is free, and wherein the transmission request message comprises a duration field that defines a duration of a first reservation period of the plurality of channels;
determining a duration of a second reservation period that ends after the first reservation period, wherein the second reservation period extends to cover a data transmission, and wherein the duration of the second reservation period is determined to be longer in a case where not all of the plurality of channels are detected to be free than in a case where all of the plurality of channels are detected to be free; and
causing the wireless communication apparatus to transmit a transmission response message as a response to the query of the transmission request message, wherein the transmission response message indicates at least one of the plurality of channels detected to be free, wherein the at least one of the plurality of channels detected to be free is reserved for the data transmission during the second reservation period.

7. The method of claim 6, wherein the reception of the transmission request message and the transmission of the transmission response message are carried out during a probing phase, wherein the duration of the first reservation period is confined to the probing phase, and wherein the duration of the second reservation period extends to protect the data transmission.

8. The method of claim 6, further comprising:
computing the duration of the second reservation period based on a number of the at least one of the plurality of channels detected to be free with respect to a number of the plurality of channels queried with the transmission request message; and
transmitting in the transmission response message an information element identifying the duration of the second reservation period.

9. An apparatus comprising:
at least one processor; and
at least one memory including computer program code, wherein the at least one memory and the computer program code are configured, with the at least one processor, to cause the apparatus to:
query which of a plurality of channels are free via transmitting a transmission request message to a wireless communication apparatus on the plurality of channels, wherein the transmission request message comprises a duration field that defines a duration of a first reservation period of the plurality of channels;
receive a transmission response message as a response to the transmission request message, wherein the transmission response message indicates at least one of the plurality of channels the wireless communication apparatus has detected to be free;
determine a duration of a second reservation period that ends after the first reservation period based on the received transmission response message, wherein the second reservation period extends to cover a data transmission, and wherein the duration of the second reservation period is determined to be longer in a case where not all of the plurality of channels are detected to be free than in a case where all of the plurality of channels are detected to be free; and
reserve the at least one of the plurality of channels detected to be free for the duration of the second reservation period and to transmit data during the second reservation period.

10. The apparatus of claim 9, wherein the at least one memory and the computer program code are configured, with the at least one processor, to cause the apparatus to carry out the transmission of the transmission request message and the reception of the transmission response message during a probing phase, wherein the duration of the first reservation period is confined to the probing phase, and wherein the duration of the second reservation period extends to protect the data transmission.

11. The apparatus of claim 9, wherein the at least one memory and the computer program code are configured, with the at least one processor, to cause the apparatus to, in response to the reception of the transmission response message, determine based on a number of the at least one of the plurality of channels detected to be free whether or not to proceed to the data transmission and to carry out the reservation of the at least one of the plurality of channels detected to be free and the determination of the duration of the second reservation period.

12. The apparatus of claim 9, wherein the at least one memory and the computer program code are configured, with the at least one processor, to cause the apparatus to:
compute the duration of the second reservation period based on a number of the at least one of the plurality of channels detected to be free with respect to a number of the plurality of channels on which the transmission request message was transmitted;
transmit a second transmission request message comprising an information element identifying the duration of the second reservation period;
receive a second transmission response message from the wireless communication apparatus in response to the second transmission request message; and
in response to the reception of the second transmission response message, transmit data to the wireless communication apparatus during the second reservation period.

13. The apparatus of claim 9, wherein the at least one memory and the computer program code are configured, with the at least one processor, to cause the apparatus to:
read the duration of the second reservation period from the received transmission response message;
compute a currently remaining duration of the second reservation period; and
transmit another transmission response message destined to the apparatus itself and comprising an information element identifying the currently remaining duration of the second reservation period, thereby effecting reservation of the at least one of the plurality of channels detected to be free in a coverage area of the apparatus.

14. The apparatus of claim 9, further comprising radio interface components providing the apparatus with radio communication capability.

15. An apparatus comprising:
at least one processor; and
at least one memory including computer program code, wherein the at least one memory and the computer program code are configured, with the at least one processor, to cause the apparatus to:
receive a transmission request message on at least one channel, wherein the transmission request message is used to query which of a plurality of channels is free, and wherein the transmission request message comprises a duration field that defines a duration of a first reservation period of the plurality of channels;
determine a duration of a second reservation period that ends after the first reservation period, wherein the second reservation period extends to cover a data transmission, and wherein the duration of the second reservation period is determined to be longer in a case where not all of the plurality of channels are detected to be free than in a case where all of the plurality of channels are detected to be free; and
transmit a transmission response message as a response to the query of the transmission request message, wherein the transmission response message indicates at least one of the plurality of channels detected to be free, wherein the at least one of the plurality of channels detected to be free is reserved for the data transmission during the second reservation period.

16. The apparatus of claim 15, wherein the at least one memory and the computer program code are configured, with the at least one processor, to cause the apparatus to carry out the reception of the transmission request message and the transmission of the transmission response message during a probing phase, wherein the duration of the first reservation period is confined to the probing phase, and wherein the duration of the second reservation period extends to protect the data transmission.

17. The apparatus of claim 15, wherein the at least one memory and the computer program code are configured, with the at least one processor, to cause the apparatus to:
compute the duration of the second reservation period based on a number of the at least one of the plurality of channels detected to be free with respect to a number of the plurality of channels queried with the transmission request message; and
transmit in the transmission response message an information element identifying the duration of the second reservation period.

18. The apparatus of claim 15, wherein the at least one memory and the computer program code are configured, with the at least one processor, to cause the apparatus to:
receive in the transmission request message an information element commanding the apparatus to compute the duration of the second reservation period; and
in response to the reception of the information element, compute the duration of the second reservation period and transmit the transmission response message identifying the duration of the second reservation period.

* * * * *

UNITED STATES PATENT AND TRADEMARK OFFICE
CERTIFICATE OF CORRECTION

| | |
|---|---|
| PATENT NO. | : 9,832,758 B2 |
| APPLICATION NO. | : 13/980218 |
| DATED | : November 28, 2017 |
| INVENTOR(S) | : Jarkko Kneckt et al. |

It is certified that error appears in the above-identified patent and that said Letters Patent is hereby corrected as shown below:

On Page 2, Column 1, under Other Publications, Line 2:
Please delete "Rresources"," and insert --Resources",--

Signed and Sealed this
Nineteenth Day of June, 2018

Andrei Iancu
*Director of the United States Patent and Trademark Office*